US008297462B1

United States Patent
Joyce

(10) Patent No.: US 8,297,462 B1
(45) Date of Patent: Oct. 30, 2012

(54) NORMALLY-CLOSED DISPENSING CLOSURE WITH OPERATIVE HANDLE

(76) Inventor: Jared L. Joyce, Bozeman, MT (US)

( * ) Notice: Subject to any disclaimer, the term of this patent is extended or adjusted under 35 U.S.C. 154(b) by 1947 days.

(21) Appl. No.: 11/232,691

(22) Filed: Sep. 21, 2005

(51) Int. Cl.
*B65D 51/04* (2006.01)
*B65D 25/28* (2006.01)
*B65D 83/00* (2006.01)
*B65D 23/10* (2006.01)
*A47G 19/22* (2006.01)
*A45F 5/00* (2006.01)

(52) U.S. Cl. .............. 220/254.5; 220/717; 220/212.5; 220/715; 215/396; 215/399; 222/470; 224/269

(58) Field of Classification Search .......... 220/715–717, 220/254.3, 756, 714; 222/566, 557, 533, 222/470, 153.14, 153.13, 536, 400.5, 405.11, 222/405.13, 405.14, 505, 517–520, 526; 224/269, 148.1, 148.2; 22/536; 215/395–399
See application file for complete search history.

(56) References Cited

U.S. PATENT DOCUMENTS

| | | | |
|---|---|---|---|
| 2,386 A | 10/1866 | Albertson | |
| 109,212 A | 11/1870 | Hoefer | |
| 3,307,752 A * | 3/1967 | Anderson | 222/465.1 |
| 3,739,938 A | 6/1973 | Paz | |
| 3,877,614 A * | 4/1975 | Murphy | 222/209 |
| 3,967,748 A | 7/1976 | Albert | |
| 4,276,992 A * | 7/1981 | Susich | 220/254.5 |
| 4,872,596 A * | 10/1989 | Corsette | 222/380 |
| 5,270,909 A | 12/1993 | Weiss et al. | |
| 5,706,985 A | 1/1998 | Feer | |
| 5,875,941 A | 3/1999 | Hsu | |
| 5,967,380 A | 10/1999 | Litvin | |
| 6,012,616 A | 1/2000 | Alberts | |
| 6,062,419 A | 5/2000 | Kruger et al. | |
| 6,098,834 A | 8/2000 | Hatsumoto | |
| 6,216,754 B1 * | 4/2001 | Geroult et al. | 141/350 |
| 6,805,266 B2 * | 10/2004 | Doron et al. | 222/475 |
| 7,416,093 B2 * | 8/2008 | Lin et al. | 220/254.5 |
| D652,256 S * | 1/2012 | Eyal | D7/510 |
| 2002/0066758 A1 * | 6/2002 | Fadal et al. | 224/148.7 |
| 2004/0217139 A1 * | 11/2004 | Roth et al. | 224/148.7 |
| 2004/0250386 A1 * | 12/2004 | Goldberg | 24/601.5 |

* cited by examiner

*Primary Examiner* — Robin Hylton
(74) *Attorney, Agent, or Firm* — Robert M. Hunter

(57) ABSTRACT

An apparatus and method for allowing a user to use the same mechanism to connect a container to another object and to open a normally-closed opening in the container. In a preferred embodiment, the apparatus comprises a closure body having an opening therein; a stopper that closes the opening; and a carabiner that comprises a spine that is fixed to said body and a gate that is operably connected to said stopper. In use, this embodiment of the invention is operated by moving the gate to a full open position, which causes the stopper to move away from the opening.

14 Claims, 13 Drawing Sheets

NORMALLY-CLOSED DISPENSING CLOSURE WITH OPERATIVE HANDLE

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

This invention relates to a closure for a bottle. In particular, the invention relates to a closure for a bottle for holding a liquid.

The background art is characterized by U.S. Pat. Nos. 2,386; 109,212; 3,739,938; 3,967,748; 5,270,909; 5,706,985; 5,875,941; 5,967,380; 6,012,616; 6,062,419; and 6,098,834 the disclosures of which patents are incorporated by reference as if fully set forth herein.

BRIEF SUMMARY OF THE INVENTION

The purpose of the invention is to allow a user to use the same closure to connect a container to another object and to open a normally-closed opening in the container. One advantage of a preferred embodiment of the invention is that it can be operated with one hand. Another advantage of a preferred embodiment of the invention is that it has a mouthpiece that can fit in a user's mouth with only about ten percent of the area of the user's open mouth not being blocked by the mouthpiece. This enables the user to "chug' the liquid at will, that is, to allow a continuous flow of liquid to enter the user's mouth. Yet another advantage of a preferred embodiment of the invention is that allows its user to carry the bottle to which it is attached with one or two fingers from above. A further advantage of a preferred embodiment is to enable its user to unclip a water bottle to which the closure has been installed from a support, take a drink, and reclip the water bottle to the support, all without having to change his hand position on the water bottle. In a preferred embodiment, the closure cap can be screwed onto any wide-mouth Nalgene® bottle.

One object of a preferred embodiment of the invention is to be operable with one hand. Another object of a preferred embodiment of the invention is to have a mouthpiece that almost fills a user's mouth. Another object of a preferred embodiment of the invention is to be capable of being carried with one or two fingers.

The invention is an apparatus and method for allowing a user to use the same closure to connect a container to another object and to open a normally-closed opening on the closure. In a preferred embodiment, the apparatus comprises a closure body having an opening therein; a stopper that closes the opening; and a carabiner that comprises a spine that is fixed to said body and a gate that is operably connected to said stopper. In use, this embodiment of the invention is operated by moving the gate to a full open position, which causes the stopper to move away from the opening.

In a preferred embodiment, the invention is a dispensing closure for a bottle, said closure comprising: a cap body, said cap body being attachable to the bottle, said cap body comprising an outer surface and an inner surface having a fulcrum, said cap body having a dispensing opening therein, said dispensing opening connecting an inner port to a mouth piece, and said cap body having a tubular passage therein into which an O-ring having an inner diameter is installed; a carabiner spine that is fixed to said cap body, said carabiner spine having a first hook; a carabiner gate that is pivotably attached to said cap body at a pivot point, said carabiner gate having a second hook that is connectable to said first hook, said carabiner gate being capable of assuming a connected position, an intermediate position and a full open position; a sealing member comprising a stopper, a lever arm having a lug, and a pivoting end that is pivotably attached to said fulcrum, said sealing member having a closed position in which it is seated against and closes said inner port and an open position in which it is not seated against and does not close said inner port, said sealing member being urged into said closed position by a first spring; a piston and a second spring that are movably seated in said tubular passage, the inner diameter of said O-ring accommodating said piston, said piston having two ends, a first end having a slot into which said lug extends, said piston being urged by said second spring in a direction that causes said sealing member to assume said closed position and said hooks to connect, and a second end; and a connecting member that movably connects said pivot point to said second end; whereby said closure is operative to close said opening when said carabiner gate is in the connected position or in the intermediate position and is operative to open said opening when said carabiner gate is in the full open position. Preferably, said inner port comprises a ridge around said dispensing opening and said stopper comprises an elastomeric pad that is configured to seal against said ridge. Preferably, said elastomeric pad is conical in shape and operative to shed water.

In a preferred embodiment, said mouthpiece is oval in shape and is sized to allow a user's mouth opening to fit around it, leaving about ten percent of said mouth opening available for air to enter said mouthpiece during a drinking operation. This enables the user to "chug' the liquid being drunk at will, that is, to allow a continuous flow of liquid to enter the user's mouth. Preferably, said cap body, said carabiner spine and said carabiner gate produce a handle defining an aperture and are configured to allow a user to grasp the closure by inserting two or three fingers into the aperture defined by this handle.

In another preferred embodiment, the invention is a container comprising: a bottle; and a dispensing closure disclosed herein. The bottle may be any type of container and the bottle and the dispensing closure may be separate components or integral.

In another preferred embodiment, the invention is a method of operating a dispensing closure comprising: providing a user with a container disclosed herein, said container having water therein; pressing downward on the carabiner gate placing it in the full open position; and placing the mouthpiece in the user's mouth and tipping the container up, thereby allowing the water to flow into the user's mouth.

In another preferred embodiment, the invention is a dispensing closure for a bottle, said closure comprising: a cap body comprising an outer surface and an inner surface having a fulcrum, said cap body having a dispensing opening and a piston guide therein; a piston slidably disposed in said piston guide, said piston having a first end and a second end; a connecting member that is pivotably connected to said first end; an operating lever having one end that is pivotably connected to said outer surface and an intermediate portion that is pivotably connected to said connecting member, said operating lever having an up position and a down position; a sealing member comprising a sealing end, a lever arm and a pivoting end, said lever arm being pivotably connected to said second end and said pivoting end being pivotably connected to said fulcrum; and a first spring that is mounted in said piston guide that urges said piston to a position that causes said sealing end to seal said dispensing opening and said operating lever to assume said up position. Preferably, the dispensing closure further comprises: a second spring that is mounted on said fulcrum that urges said sealing end to seal said dispensing opening. Preferably, the dispensing closure further comprises: a carabiner spine that is fixed to said outer surface, said carabiner spine having a first hook; and wherein said lever is a carabiner gate having a second hook that engages with said first hook when said carabiner gate is in the up position. Preferably, the dispensing closure further comprises: a mouthpiece that protrudes from said outer surface; and wherein said dispensing opening perforates said mouthpiece.

In an alternative embodiment, the invention is a dispensing closure for a bottle, said closure comprising: a cap body, said cap body being attachable to the bottle, said cap body comprising an outer surface and an inner surface having a fulcrum, and said cap body having a dispensing opening therein, said dispensing opening connecting an inner port to a mouthpiece, and said cap body having a tubular passage therein; a loop that is fixed to said cap body, said loop forming an aperture; a button that is movably attached to said cap body, said button being situated in said aperture and being capable of linear movement between an up position and a down position; a sealing member comprising a stopper end, a lever arm having a lug, and a pivoting end that is pivotably attached to said fulcrum, said sealing member having a closed position in which it is seated against and closes said inner port and an open position in which it is not seated against and does not close said inner port; a piston that is movably seated in said tubular passage into which an O-ring is installed, the inner diameter of said O-ring accommodating said piston, said piston having two ends, one end having a slot into which said lug extends, said piston being urged in a direction that causes said sealing member to assume a closed position by a spring, and another end that is connected to said button; whereby said closure is operative to close said opening when said button is in up position and is operative to open said opening when said button is moved to the down position.

In another alternative embodiment, the invention is a dispensing closure for a bottle, said closure comprising: a cap body, said cap body being attachable to the bottle, said cap body comprising an outer surface and an inner surface having a fulcrum, and said cap body having a dispensing opening therein, said dispensing opening connecting an inner port to a mouthpiece; a carabiner spine that is fixed to said cap body, said carabiner spine having a first hook; a carabiner gate that is pivotably attached to said cap body, said carabiner gate having a second hook that is connectable to said first hook, said carabiner gate comprising a first pivot point and being capable of assuming a connected position and an unconnected position; a button that is movably attached to said cap body, said button being capable of linear movement in a first direction between an out position and a depressed position; a sealing member comprising a stopper end, a lever arm having a lug, and a pivoting end that is pivotably attached to said fulcrum at a second pivot point, said sealing member having a closed position in which it is seated against and closes said inner port and an open position in which it is not seated against and does not close said inner port; a mechanism that links said button to said sealing member, said mechanism causing movement of said button in said first direction to move said sealing member about said second pivot point; whereby said closure is operative to close said opening when said button is in the out position and is operative to open said opening when said button is in the depressed position.

In yet another alternative embodiment, the invention is a dispensing closure for a bottle, said closure comprising: a cap body, said cap body being attachable to the bottle, said cap body comprising an outer surface and an inner surface having a fulcrum, and said cap body having a dispensing opening therein, said dispensing opening connecting an inner port to a mouthpiece; a carabiner spine that is fixed to said cap body, said carabiner spine having locating pin; a carabiner gate that is slidably attached to said cap body, said carabiner gate having a hole that accepts said locating pin, said carabiner gate being capable of assuming a connected position and an unconnected position; a button that is movably attached to said cap body, said button being capable of linear movement in a first direction between an out position and a depressed position, said button being attached to said carabiner gate and moving with said carabiner gate; a sealing member comprising a stopper end, a lever arm having a lug, and a pivoting end that is pivotably attached to said inner surface at said fulcrum, said sealing member having a closed position in which it is seated against and closes said inner port and an open position in which it is not seated against and does not close said inner port; a mechanism that links said button to said sealing member, said mechanism causing movement of said button in said first direction to move said sealing member about said pivot point; whereby said closure is operative to close said opening and said carabiner gate when said button is in the out position and is operative to open said opening and said carabiner gate when said button is moved to the depressed position.

In a further alternative embodiment, the invention is a dispensing closure for a bottle, said closure comprising: a cap body, said cap body being attachable to the bottle, said cap body comprising an outer surface and an inner surface having a fulcrum, and said cap body having a dispensing opening therein, said dispensing opening connecting an inner port to a mouthpiece, and said cap body having a tubular passage therein; a loop having a first portion that is fixed to said cap body and a second portion that is capable of pivoting movement around a first pivot point between a connected position and an unconnected position; a sealing member comprising a stopper end, a lever arm that is pivotably attached to said fulcrum, and a pivoting end, said sealing member having a closed position in which it is seated against and closes said inner port and an open position in which it is not seated against and does not close said inner port; and a connecting member that links said second portion to said pivoting end, said mechanism causing movement of said second portion to said out position to move said sealing member to said open position.

In yet another alternative embodiment, the invention is a dispensing closure for a bottle, said closure comprising: a cap body comprising an outer surface having a mouthpiece and an inner surface having a fulcrum, said cap body having a dispensing opening therein; means for connecting said cap body to a carabiner; means for operating that is movably attached to said cap body, said means for operating having a first position and a second position; a sealing member comprising a sealing end and a lever arm, said lever arm being connected to said means for operating and to said fulcrum, said sealing member having a closed position and an open position; and a first spring that is mounted on said cap body that is operative to urge said sealing end to assume said closed position in which it seals said dispensing opening when said means for operating is in said first position; wherein movement of said means for operating to said second position is operative to cause said sealing end to assume said open position in which it does not seal said dispensing opening; and wherein said mouthpiece is oval in shape and is sized to allow a user's mouth opening to fit around it, leaving a portion of said mouth opening available for air to enter said mouthpiece during a drinking operation.

In yet another alternative embodiment, the invention is a dispensing closure for a bottle, said closure comprising: a cap body, said cap body being attachable to the bottle, said cap body having a slide cavity and a dispensing opening therein, said dispensing opening connecting an inner port to a mouthpiece; a carabiner spine that is fixed to said cap body, said carabiner spine having a first hook; a carabiner gate that is pivotably attached to said cap body, said carabiner gate having a second hook that is connectable to said first hook, said carabiner gate being capable of assuming a connected position and an unconnected position; and a slide that is mounted in said slide cavity, said slide having a hole therein and being capable of linear movement in a first direction between an out position and a depressed position, said slide having a closed position in said hole is not aligned with said inner port and an open position in which said hole is aligned with said inner port; whereby said closure is operative to close said dispensing opening when said slide is in the out position and is operative to open said dispensing opening when said slide is in the depressed position. Preferably, the dispensing closure further comprising at least one spring, said closure body further comprises a pin and said slide is provided with a main indent, a side indent and at least one cavity, said main indent accommodating an O-ring, said side indent accommodating said pin and said at least one cavity accommodating said at least one spring.

In another alternative embodiment, the invention is a dispensing closure for a bottle, said closure comprising: a cap body, said cap body having a dispensing opening therein; means for connecting said cap body to a carabiner; means for operating that is movably attached to said cap body, said means for operating having a first position and a second position; a sealing member, said sealing member having a closed position and an open position; and a first spring that is mounted on said cap body that is operative to urge said sealing member to assume said closed position in which it seals said dispensing opening when said means for operating is in said first position; wherein movement of said means for operating to said second position is operative to cause said sealing member to assume said open position in which it does not seal said dispensing opening; and wherein said mouthpiece is oval in shape and is sized to allow a user's mouth opening to fit around it, leaving a portion of said mouth opening available for air to enter said mouthpiece during a drinking operation.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently preferred embodiments of the invention. In the drawings.

Figure 1:
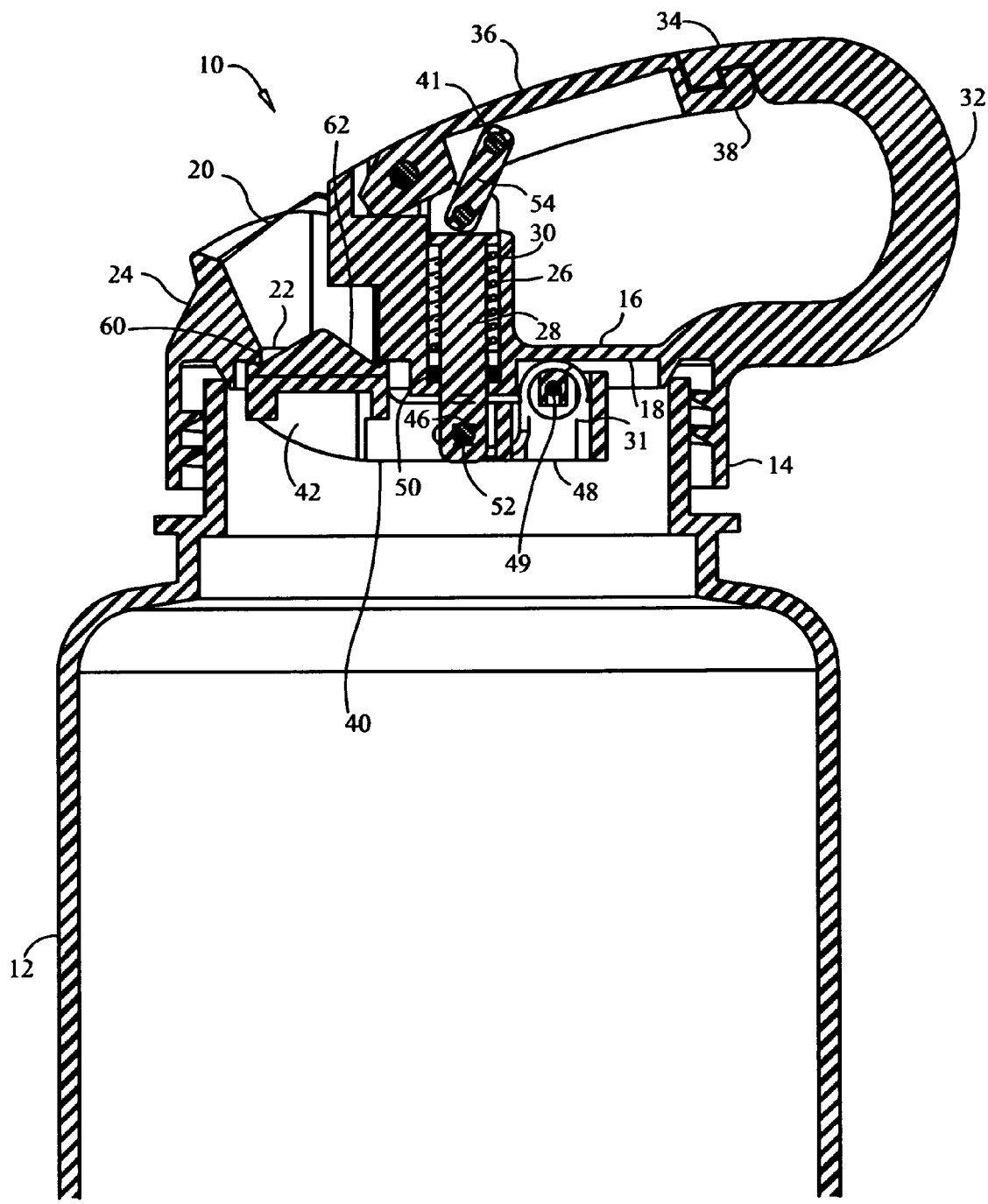
FIG. 1 is a partial cross sectional view of a preferred embodiment of the closure installed on the neck of a bottle with the carabiner gate in the connected position.

The following reference numerals are used to indicate the parts and environment of the invention on the drawings:

| | |
|---|---|
| 10 | closure, dispensing closure |
| 12 | bottle |
| 14 | cap body |
| 16 | outer surface |
| 18 | inner surface |
| 20 | dispensing opening |
| 22 | inner port |
| 24 | mouthpiece |
| 26 | tubular passage, piston guide |
| 28 | piston |
| 30 | first spring |
| 31 | second spring |
| 32 | carabiner spine |
| 34 | first hook |
| 36 | carabiner gate |
| 38 | second hook |
| 40 | sealing member |
| 41 | connection point |
| 42 | stopper, stopper end |
| 44 | lever arm |

-continued

| | |
|---|---|
| 46 | lug |
| 48 | pivoting end |
| 49 | fulcrum |
| 50 | O-ring |
| 52 | slot, hole |
| 54 | connecting member |
| 59 | loop |
| 60 | ridge |
| 61 | aperture |
| 62 | elastomeric pad |
| 64 | vertically-oriented button |
| 66 | horizontally-oriented button |
| 70 | pivoting mechanism |
| 72 | locating pin |
| 74 | first portion |
| 76 | second portion |
| 78 | pivot point |
| 80 | slide |
| 82 | slide cavity |
| 84 | main indent |
| 86 | side indent |
| 88 | main hole |
| 90 | spring cavities |

DETAILED DESCRIPTION OF THE INVENTION

Figure 2:
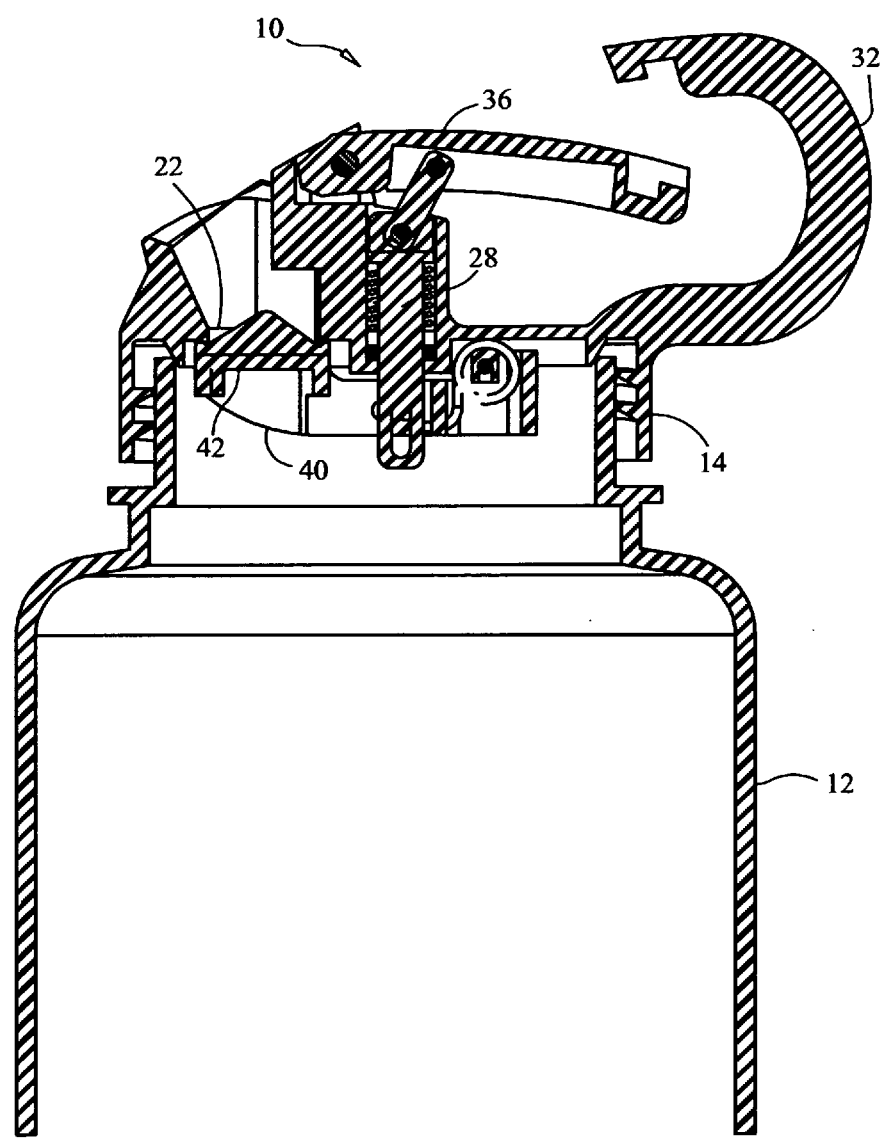
FIG. 2 is a partial cross sectional view of a preferred embodiment of the closure installed on the neck of a bottle with the carabiner gate in the intermediate position.
Figure 3:
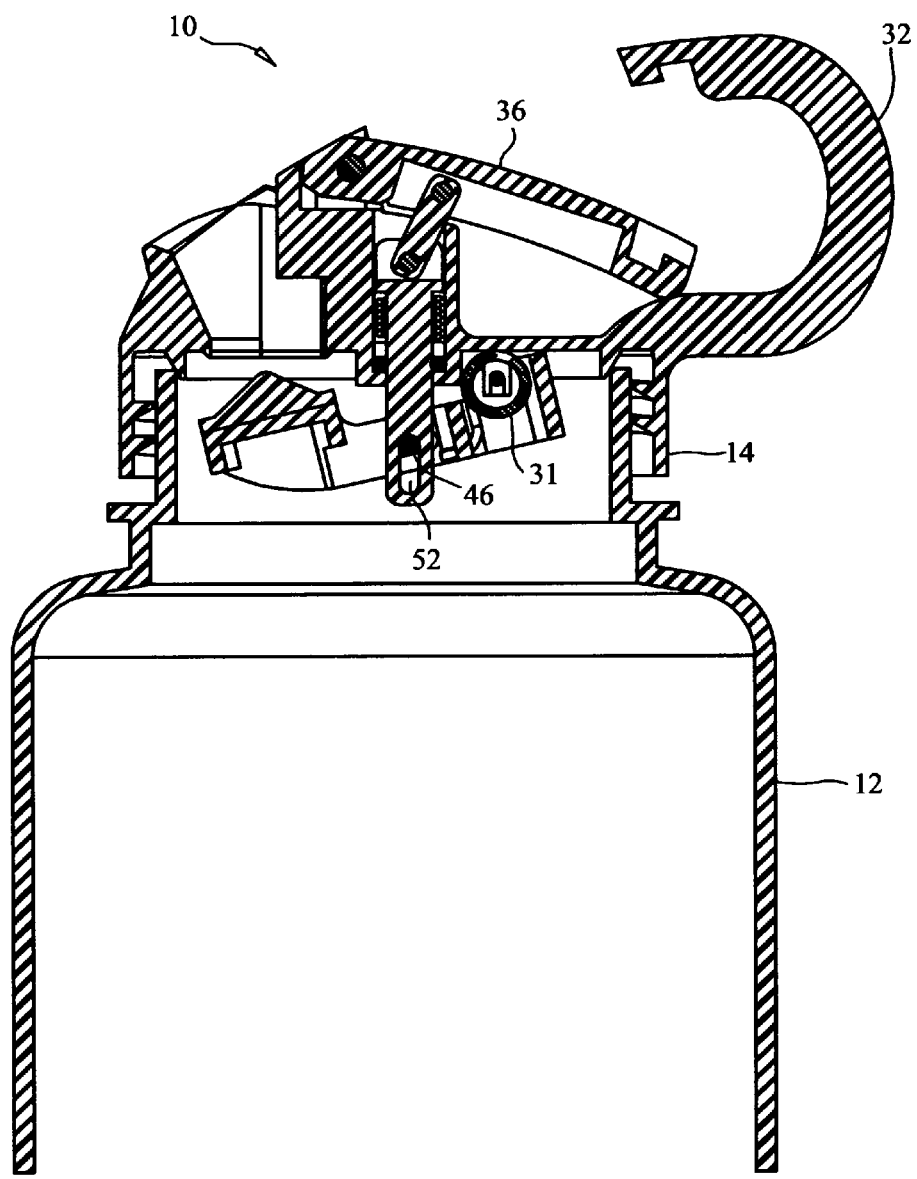
FIG. 3 is a partial cross sectional view of a preferred embodiment of the closure installed on the neck of a bottle with the carabiner gate in the full open position.

Referring to FIGS. 1-3, a preferred embodiment of closure 10 on bottle 12 is illustrated. In this embodiment, closure 10 comprises cap body 14 which has outer surface 16 and inner surface 18. Cap body 14 has dispensing opening 20 in it, which connects inner port 22 to the top of mouthpiece 24, and tubular passage 26 in it, in which piston 28 and first spring 30 are mounted. While FIG. 1 shows closure 10 being attached to bottle 12 by means of threads on closure 10 and on the neck of bottle 12, a person having ordinary skill in the art would understand that closure 10 may be attached to bottle 12 by any means, either temporarily or permanently. Preferably, bottle 12 is a wide-mouth Nalgene® bottle.

In this embodiment, carabiner spine 32, having a first hook 34, is fixed to cap body 14, and carabiner gate 36, having second hook 38 and pivot point 41, is pivotably attached to cap body 14. Carabiner gate 36 is shown in a connected position in FIG. 1. Inner port 22 can be closed by sealing member 40, which comprises stopper end 42, lever arm 44 having lug 46 and pivoting end 48 that is pivotably attached to fulcrum 49 on inner surface 18.

Referring to FIG. 1, carabiner gate 36 is shown in a connected position. Sealing member 40 is disposed in the closed position, in which position it is seated against and closes inner port 22. In this condition, the liquid in bottle 10 is not accessible via mouth piece 24. Preferably, ridge 60 is formed around inner port 22 and stopper 42 is provided with elastomeric pad 62 that is configured to seal against ridge 60 when stopper 42 is in the closed position. Preferably, elastomer pad 62 has the shape of an inverted cone, which shape causes any liquid present in mouthpiece 24 to drain back into container 12 when it is held in the upright position and stopper 42 is not in the closed position.

In this embodiment, cap body 14, carabiner spine 32 and carabiner gate 32 produce a handle and are configured to allow a user to grasp the closure by inserting two or three fingers in the space defined by this handle. In this condition, the liquid in bottle 12 is not accessible and closure 10 can be attached to a support or a carabiner.

O-ring 50 is mounted in the inner surface of tubular passage 26 and has an interference fit with piston 28, preventing the contents of bottle 12 from entering tubular passage 26. Piston 28 has a slot 52 in its lower end which engages with lug 46 and is movably attached to connection point 41 by connecting member 54. Piston 28 is urged in an upward direction and its movement in that direction causes sealing member 40 to assume a closed position and hooks 34 and 38 to connect. Closure 10 is operative to close dispensing opening 20 when carabiner gate 32 is in the connected position (illustrated in FIG. 1) or in the intermediate position (illustrated in FIG. 2) and is operative to open opening 20 when carabiner gate 32 is in the full open position (illustrated in FIG. 3). Piston 28 may have any cross-sectional shape, but it cross-sectional shape is preferably circular. In a preferred embodiment, the moveable parts of the invention are fastened to one another by means of shape fitted components. For example, connecting member 54 preferably snaps onto connection point 41.

In this embodiment, closure 10 further comprises second spring 31 that also urges sealing member into the closed position. Second spring 31 does not act upon piston 28 until piston 28 is moved downward to the extent that lug 46 is moved to the top of slot 52.

Referring to FIG. 2, closure 10 is illustrated with carabiner gate 32 in the intermediate position. In this position, piston 28 moves downward but sealing member 40 is not pivoted downward. In this position, stopper 42 is still urged against inner port 22, closing it. In this condition, the liquid in bottle 10 is not accessible and closure 10 can be hung from attached to a support.

Referring to FIG. 3, closure 10 is illustrated with carabiner gate 36 in the full open position and with stopper 42 in the open position. In this condition, the liquid in bottle 12 is accessible.

Figure 4:
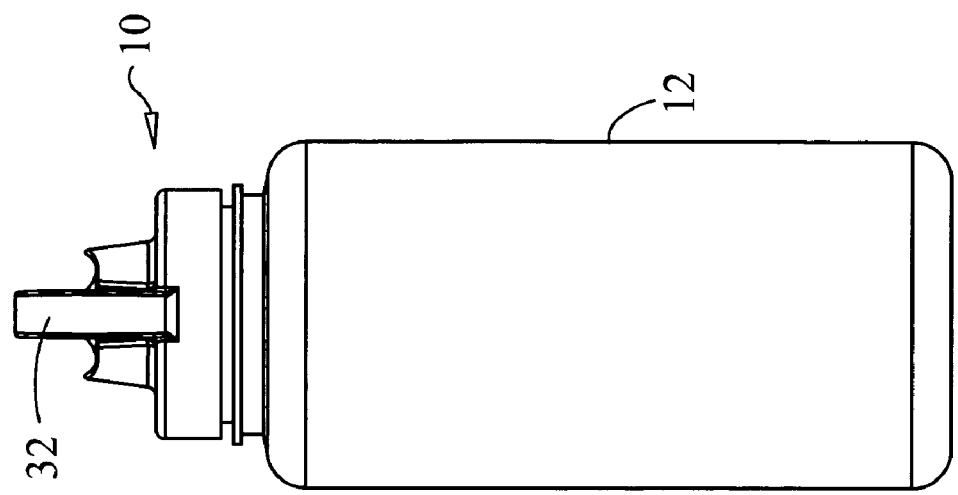
FIG. 4 is an elevation view of a preferred embodiment of the closure installed on the neck of a bottle with the carabiner gate in the connected position. This view shows the handle formed by the carabiner.
Figure 5:
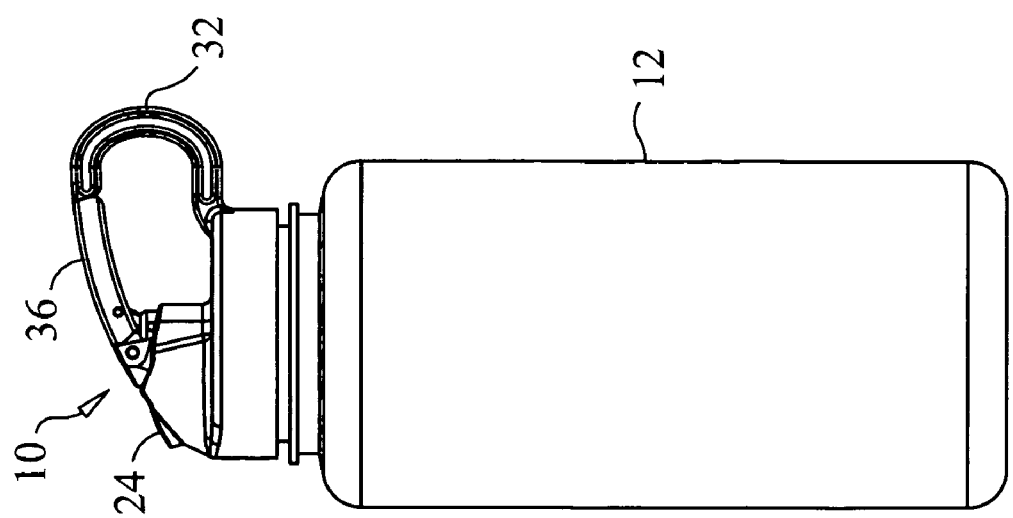
FIG. 5 is another elevation view of a preferred embodiment of the closure installed on the neck of a bottle with the carabiner gate in the connected position. This view is from the carabiner side of the closure.
Figure 6:
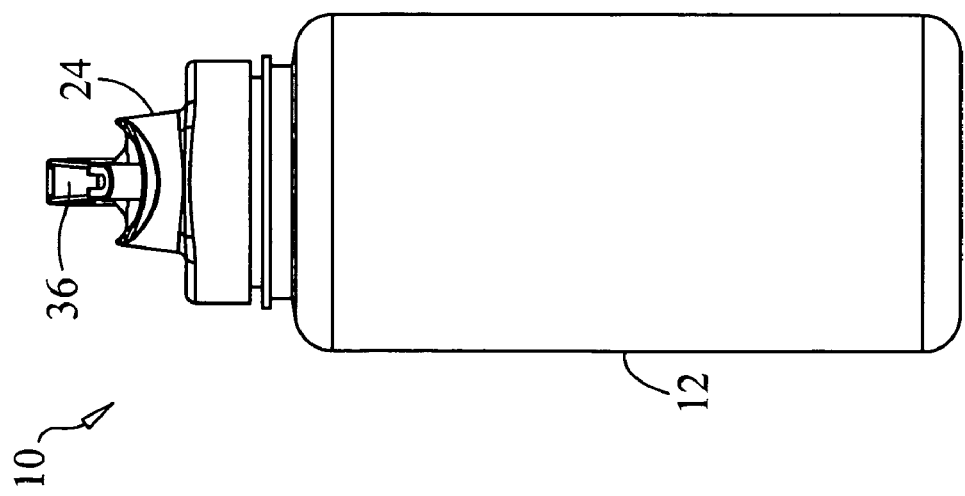
FIG. 6 is another elevation view of a preferred embodiment of the closure installed on the neck of a bottle with the carabiner gate in the connected position. This view is from the mouthpiece side of the closure.

Referring to FIGS. 4-6, elevation view of a preferred embodiment of closure 10 is presented. In this embodiment, mouthpiece 24 is preferably oval in shape and is sized to allow a user's mouth opening to fit around it, leaving about ten percent of said mouth opening available for air to enter said mouthpiece during a drinking operation. This enables the user to "chug" the liquid, that is, to allow a continuous flow of liquid to enter the user's mouth.

In this embodiment, the inside surface of mouthpiece 24 is angled such that if bottle 12 is perpendicular to the floor or if bottle 12 is angled at about forty-five degrees from the perpendicular (toward the drinker's mouth), the inside surface of mouthpiece 24 is still disposed at an angle that directs the flow of liquid in dispensing opening 20 back into bottle 12. The surface that directs liquid back into bottle 12 is void of texture so as to enhance the flow rate of the liquid back into bottle 12 before the stopper 42 closes port 22 by sealing against ridge 60. The conical shape of elastomeric pad 62 aids in the process of emptying dispensing opening of liquid after the user is finished drinking from bottle 12.

Figure 7:
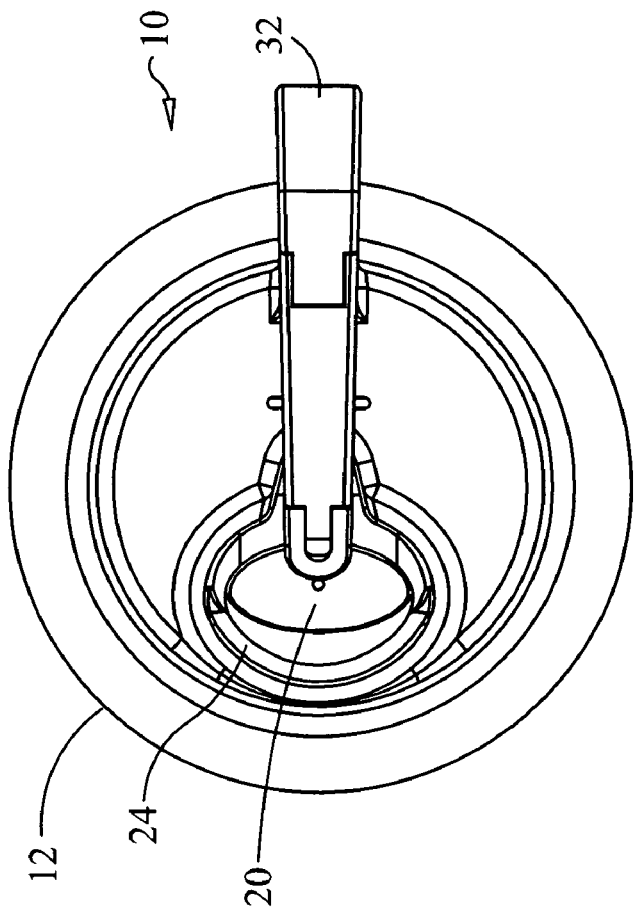
FIG. 7 is a plan (top) view of a preferred embodiment of the closure installed on the neck of a bottle.

Referring to FIG. 7, a plan view of closure 10 on bottle 12 is presented. In this view, dispensing opening 20 is visible and the preferred oval shape of mouthpiece 24 is apparent. In this embodiment, elastomeric pad 62 has a substantially flat tip with a diameter of about 1/16 inch.

Operation of the invention involves filling bottle 12 with water and installing closure 10 or providing a user with a bottle/closure combination that contains water or some other liquid. When the user desired to drink some of the liquid, he presses downward on the carabiner gate placing it in the full open position and places the mouthpiece in his mouth and tipping the container up, thereby allowing the water to flow into his mouth. With preferred embodiments, mouthpiece 24 fills only about 90 percent of the user's mouth opening, allowing air to enter his mouth opening and mouthpiece 24 during a drinking operation, thus enabling the user to "chug' the liquid at will, that is, allow a continuous flow of liquid to enter the user's mouth.

Alternatively, if the carabiner of closure 10 is connected to a support object or another carabiner, carabiner gate 36 is first moved to the intermediate position and the closure/bottle combination is disconnected from the support object. In the intermediate position, dispensing opening 20 is sealed in the closed condition by stopper 42. Then, the user moves carabiner gate 36 to the full open position, which opens dispensing opening 20, and drinks.

Figure 9:
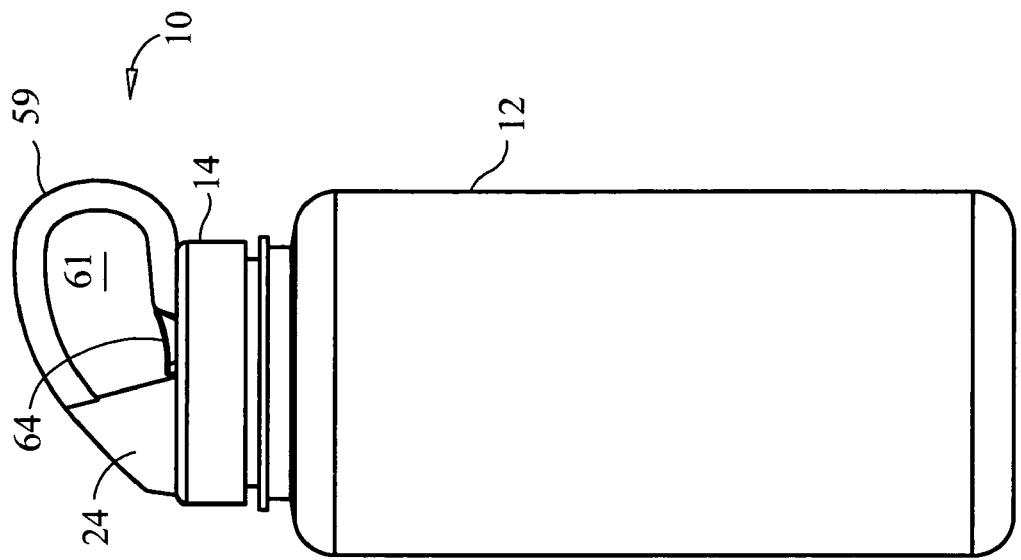
FIGS. 8 and 9 are elevation views of an alternative embodiment of the closure installed on the neck of a bottle.
Figure 8:
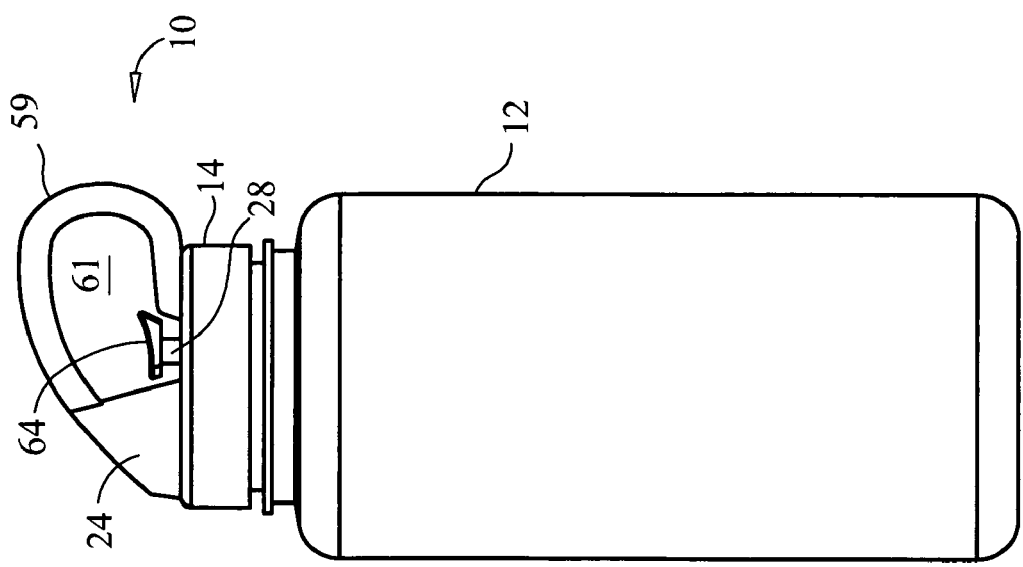

Referring to FIGS. 8 and 9, an alternative embodiment of the invention is illustrated. This embodiment is similar to the preferred embodiment described above, except that a user uses a vertically-oriented button to operate the closure instead of a carabiner gate. In this embodiment, dispensing closure 10 comprises cap body 14 having an inner surface to which a fulcrum (not shown) is attached and a inner port (not shown), loop 59 that is fixed to cap body 14, said loop forming aperture 61 and vertically-oriented button 64 that is movably attached to cap body 14. Button 64 is preferably situated in aperture 61 and is capable of linear movement between an up position and a down position. Dispensing closure 10 also comprises a sealing member (not shown) comprising a stopper end, a lever arm having a lug, and a pivoting end that is pivotably attached to the fulcrum. The sealing member can assume a closed position in which it is seated against and closes said inner port and an open position in which it is not seated against and does not close said inner port. Piston 28 is movably seated in said tubular passage into which an O-ring is installed, the inner diameter of said O-ring accommodating piston 28. Piston 28 has two ends, one end having a hole into which the lug extends, the piston being urged in a direction that causes the sealing member to assume a closed position by at least one spring, and another end that is connected to button 64. Closure is operative to close said opening when vertically-oriented button 64 is in up position (illustrated in FIG. 8) and is operative to open said opening when button 64 is moved to the down position by the user (illustrated in FIG. 9).

Figure 11:
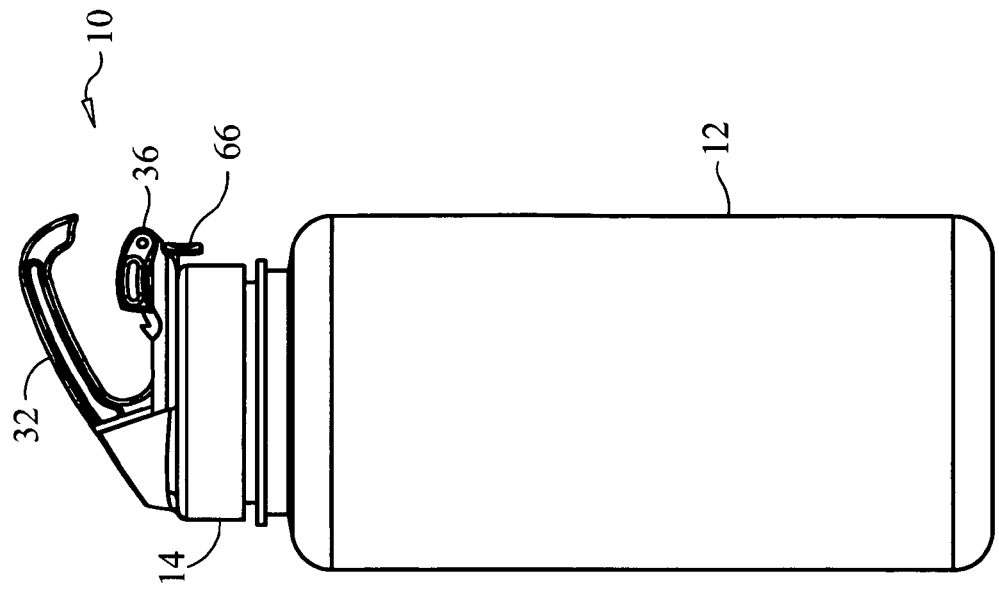
FIGS. 10 and 11 are elevation views of another alternative embodiment of the closure installed on the neck of a bottle.
Figure 10:
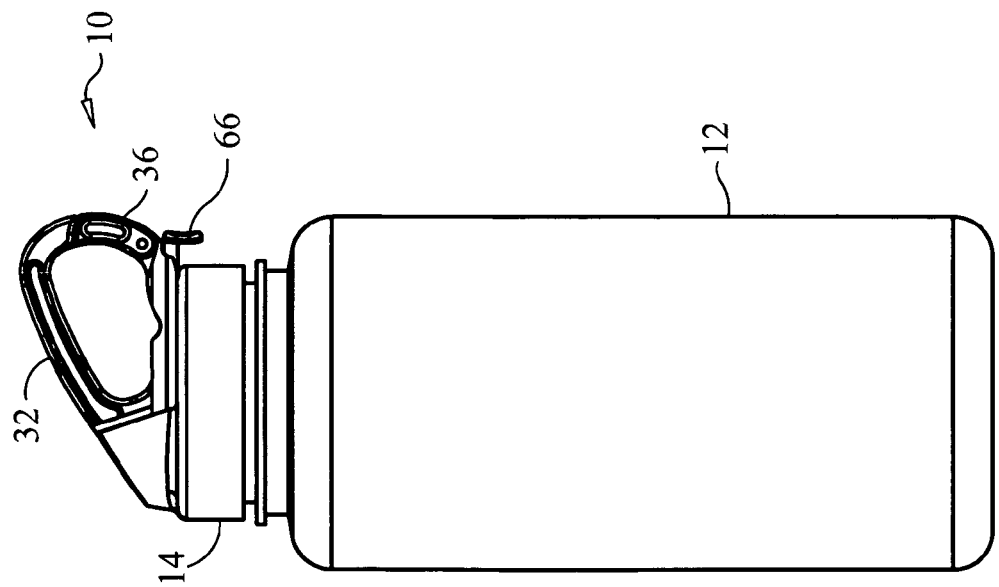
Figure 12:
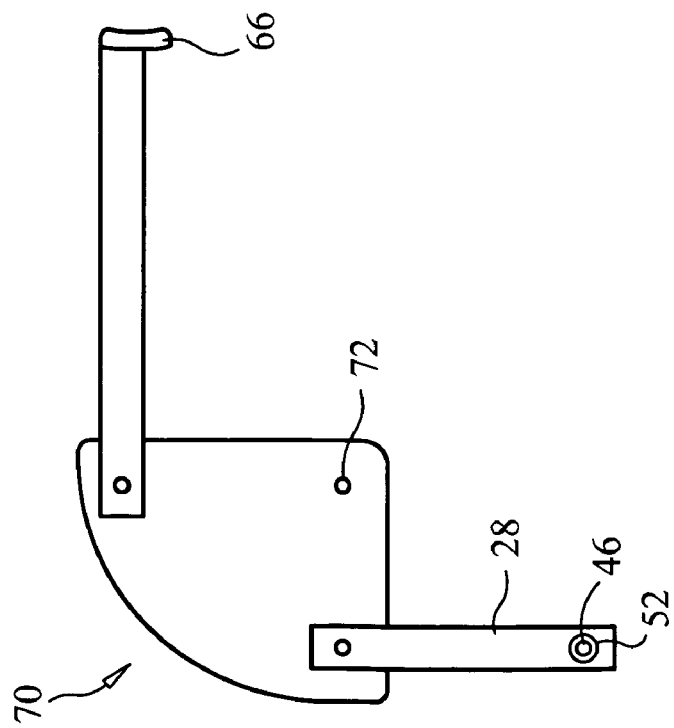
FIG. 12 is a schematic diagram of the mechanism of the alternative embodiment of FIGS. 10 and 11.

Referring to FIGS. 10-12, another alternative embodiment of the invention is illustrated. This embodiment is similar to the preferred embodiment described above, except that a user uses a horizontally-oriented button to operate the closure instead of a carabiner gate. In this embodiment, dispensing closure 10 comprises cap body 14, said cap body being attachable to the bottle 12. Cap body 14 comprises an outer surface and an inner surface having a fulcrum, and has a dispensing opening therein, the dispensing opening connecting an inner port to a mouthpiece. Carabiner spine 32 is fixed to cap body 14. Carabiner gate 36 is pivotably attached to cap body 14 at a first connection point and is capable of assuming a connected position and an unconnected position. Horizontally-oriented button 66 is movably attached to cap body 14, button 66 being capable of linear movement in a first direction between an out position (illustrated in FIG. 10) and a depressed position (illustrated in FIG. 11). A sealing member (not shown) comprises a stopper end, a lever arm having a lug, and a pivoting end that is pivotably attached to said fulcrum, said sealing member having a closed position in which it is seated against and closes said inner port and an open position in which it is not seated against and does not close said inner port. Pivoting mechanism 70 (shown in FIG. 12) preferably links button 66 to lug 46 through piston 28, said mechanism causing movement of button 66 in said first direction to pivot said sealing member about pivot 72. A person having ordinary skill in the art would recognize that other mechanisms could be used to convert the horizontal motion of button 66 into vertical motion of piston 28. Closure 10 is operative to close the dispensing opening when button 66 is in the out position and is operative to open the dispensing opening when button 66 is in the depressed position.

Figure 13:
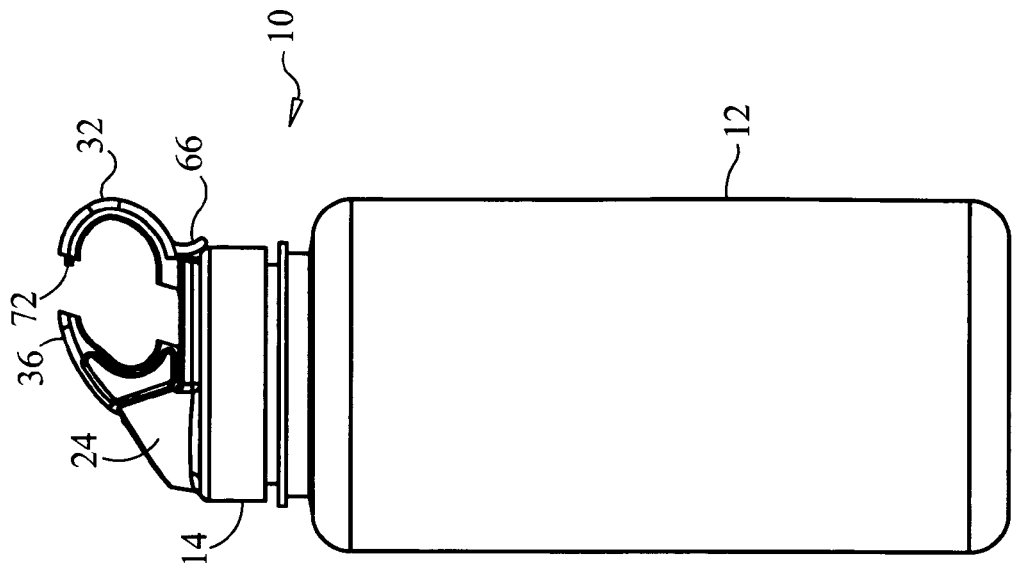
FIGS. 13 and 14 are elevation views of yet another alternative embodiment of the closure installed on the neck of a bottle.
Figure 14:
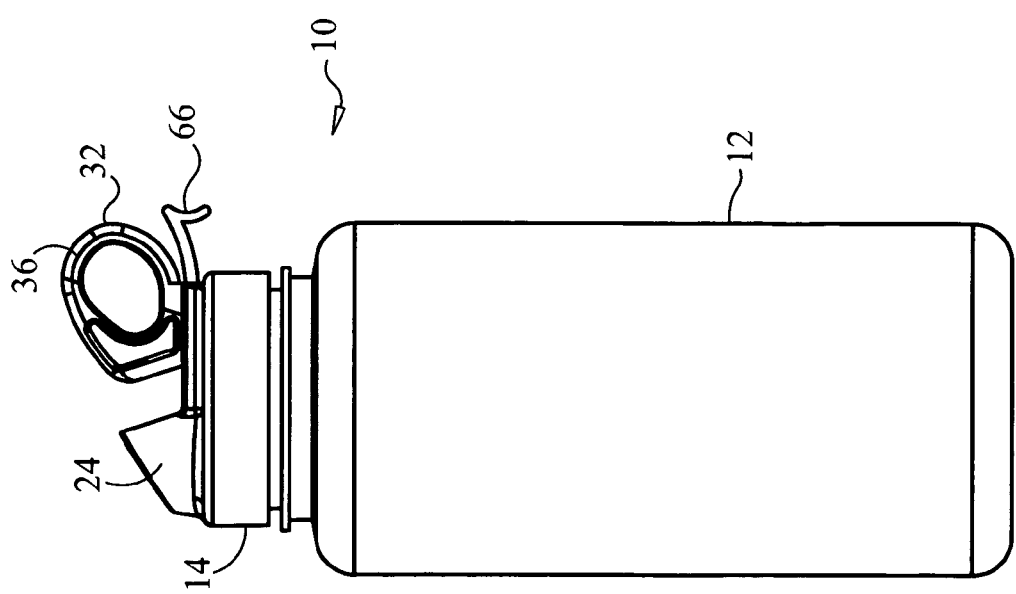

Referring to FIGS. 13-14, another alternative embodiment of the invention is illustrated. This embodiment is also similar to the preferred embodiment described above, except that a user uses a horizontally-oriented button to operate the closure instead of a carabiner gate. In this embodiment, dispensing closure 10 comprises cap body 14, said cap body being attachable to the bottle 12. Cap body 10 comprises an outer surface and an inner surface having a fulcrum, and has a dispensing opening therein, the dispensing opening connecting an inner port to a mouthpiece. Carabiner spine 32 is fixed to cap body 14 and comprises locating pin 72. Carabiner gate 36 is slidably attached to cap body 14, carabiner gate 36 having a hole that accepts locating pin 72 and being capable of assuming a connected position and an unconnected position. Horizontally-oriented button 66 is movably attached to cap body 14, button 66 being capable of linear movement in a first direction between an out position (illustrated in FIG. 13) and a depressed position (illustrated in FIG. 14). A sealing member (not shown) comprises a stopper end, a lever arm having a lug, and a pivoting end that is pivotably attached to said fulcrum, said sealing member having a closed position in which it is seated against and closes said inner port and an open position in which it is not seated against and does not close said inner port. Pivoting mechanism 70 (shown in FIG. 12) preferably links button 66 to lug 46 through piston 28, said mechanism causing movement of button 66 in said first direction to pivot said sealing member about pivot 72. A person having ordinary skill in the art would recognize that other mechanisms could be used to convert the horizontal motion of button 66 into vertical motion of piston 28. Closure 10 is operative to close the dispensing opening when button 66 is in the out position and is operative to open the dispensing opening when button 66 is in the depressed position.

Figure 17:
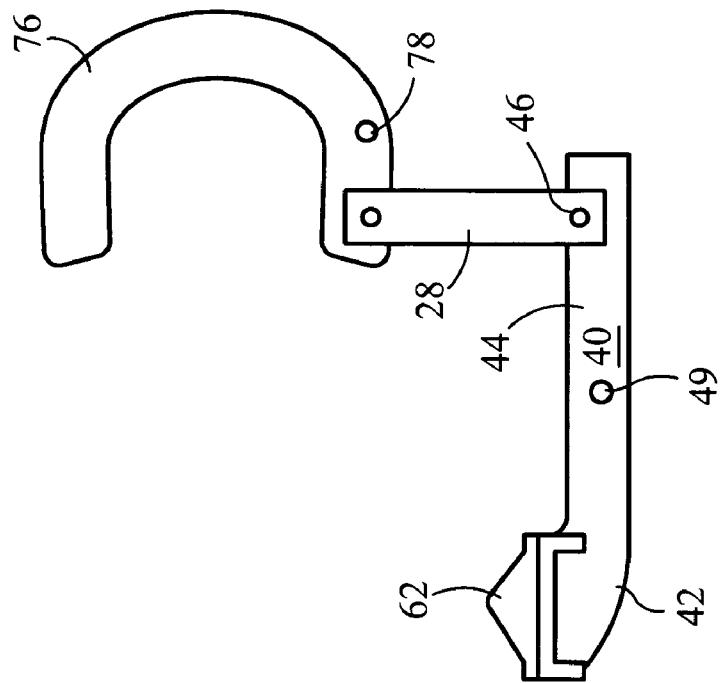
FIG. 17 is a schematic diagram of the mechanism of the alternative embodiment of FIGS. 15 and 16.
Figure 15:
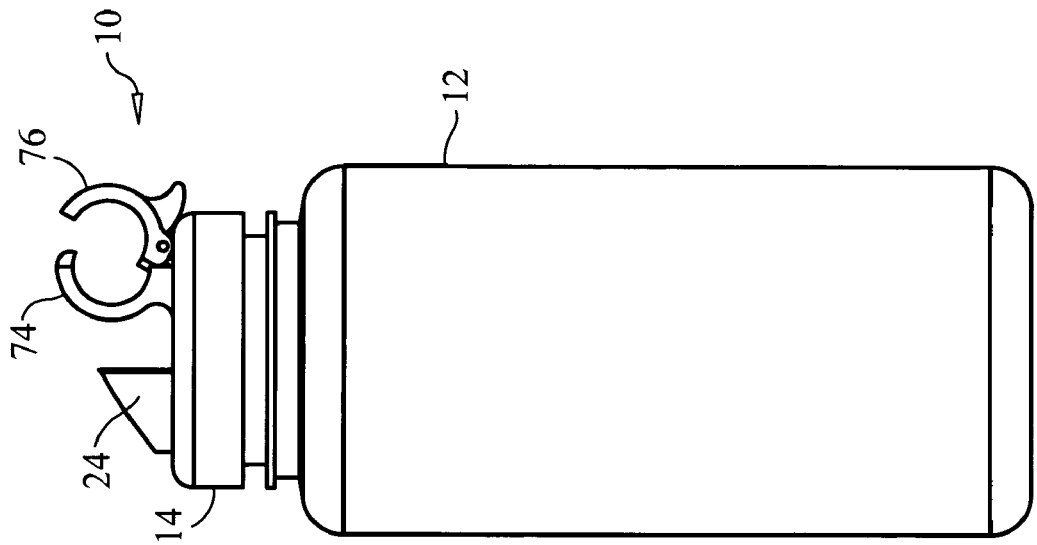
FIGS. 15 and 16 are elevation views of yet another alternative embodiment of the closure installed on the neck of a bottle.
Figure 16:
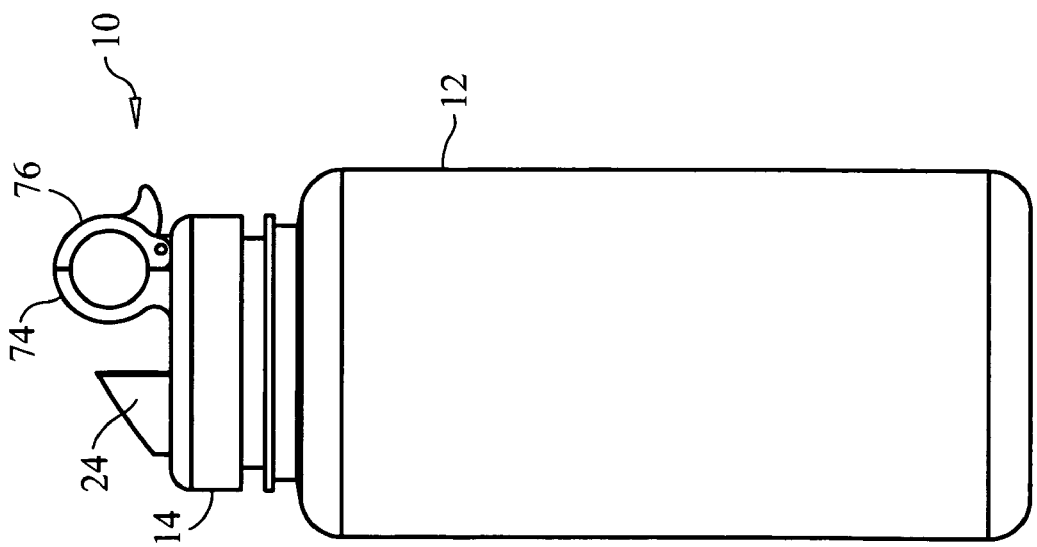

Referring to FIGS. 15-16, yet another alternative embodiment of the invention is illustrated. This embodiment is similar to the preferred embodiment described above, except that a user uses a portion of a loop connected to cap body 14 to operate the closure. In this embodiment, dispensing closure 10 comprises cap body 14, said cap body being attachable to the bottle 12. Cap body 10 comprises an outer surface and an inner surface having a fulcrum, and has a dispensing opening therein, the dispensing opening connecting an inner port to a mouthpiece. Loop 60 has first portion 74 that is fixed to cap body 14 and second portion 76 that is capable of pivoting movement around pivot point 78 between a connected position (illustrated in FIG. 15) and an unconnected position (illustrated in FIG. 16). Referring to FIG. 17, second portion 76 is preferably connected to sealing member 40 by piston 28. Sealing member 40 comprises stopper end 42 and lever arm 44 that is pivotably attached to fulcrum 49, sealing member 40 having a closed position in which it is seated against and closes the inner port and an open position in which it is not seated against and does not close the inner port. A person having ordinary skill in the art would recognize that other mechanisms could be used to convert the pivoting motion of second portion 76 into vertical motion of piston 28. Closure 10 is operative to close the dispensing opening when second portion 76 is in the closed position and is operative to open the dispensing opening when second portion 76 is in the open position.

Figure 18:
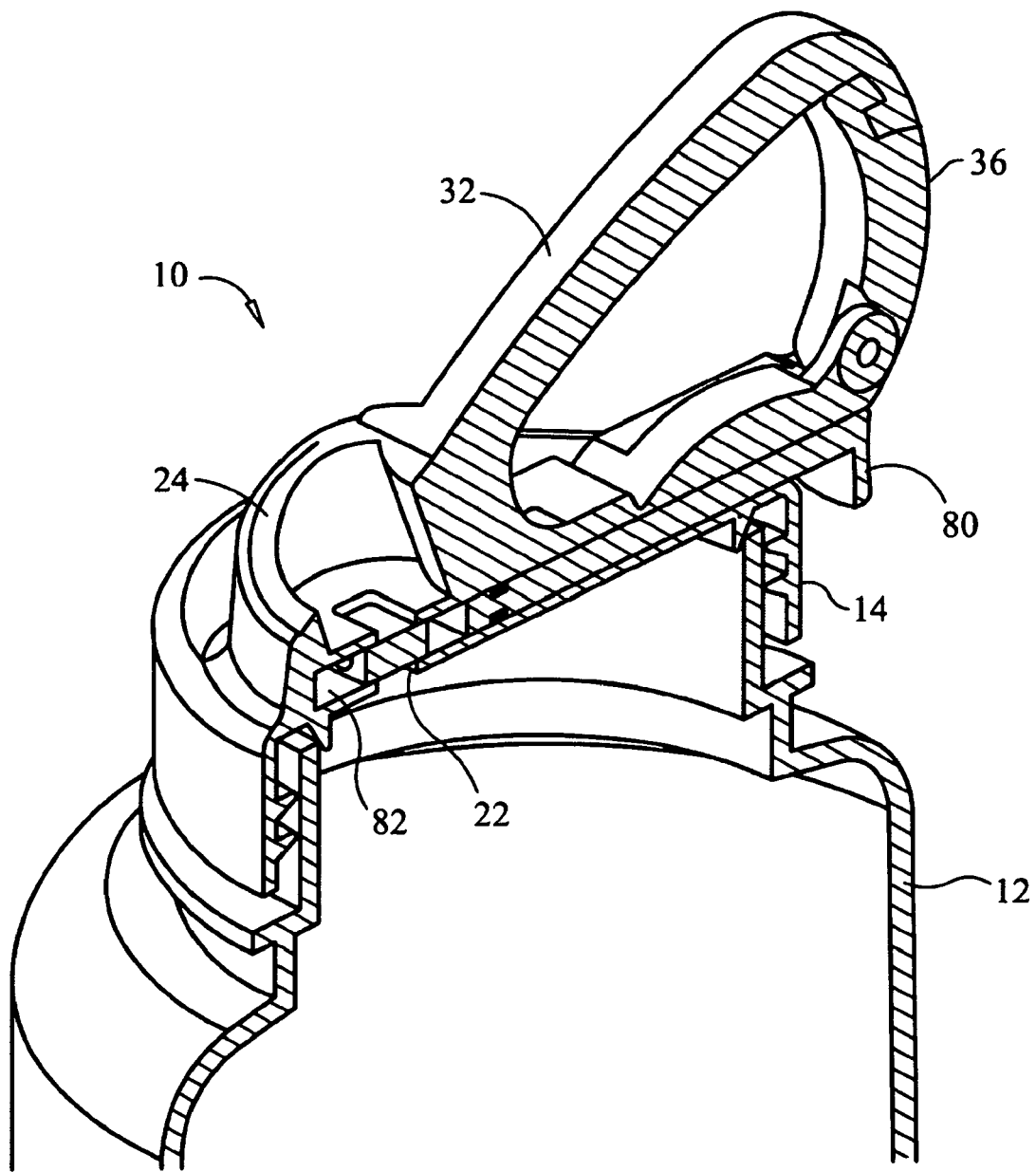
FIG. 18 is a perspective cross sectional view of another alternative embodiment of the invention installed on a bottle. In this view, the closure is in the closed condition.
Figure 19:
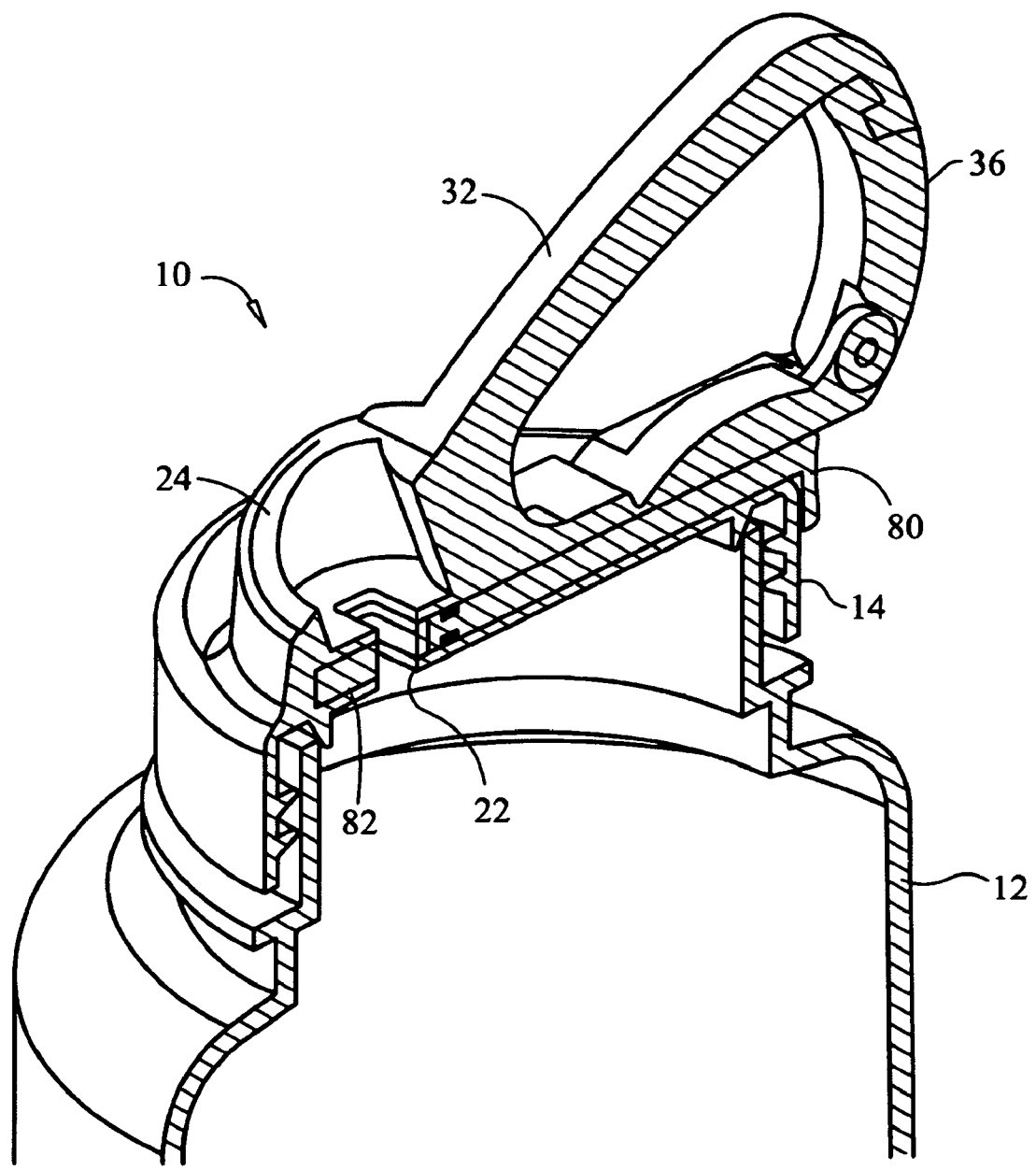
FIG. 19 is a perspective cross sectional view of the embodiment of the invention of FIG. 18 installed on a bottle. In this view, the closure is in the open condition.

Referring to FIGS. 18 and 19, another alternative embodiment of the invention is presented. In this embodiment, a user uses a horizontally-oriented button to operate the closure instead of a carabiner gate. Dispensing closure 10 comprises cap body 14, cap body 14 being attachable to the bottle 12. Cap body 14 has a dispensing opening therein, the dispensing opening connecting inner port 22 to mouthpiece 24. Cap body 14 is provided with slide cavity 18 for accommodating slide 80. Carabiner spine 32 is preferably fixed to cap body 14. Carabiner gate 36 is preferably pivotably attached to cap body 14 at a first connection point and is capable of assuming a connected position (shown in FIGS. 18 and 19) and an unconnected position (not shown). Slide 80 is movably attached to cap body 14, slide 80 being capable of linear movement in a first direction between an out position (illustrated in FIG. 18) and a depressed position (illustrated in FIG. 19).

Figure 20:
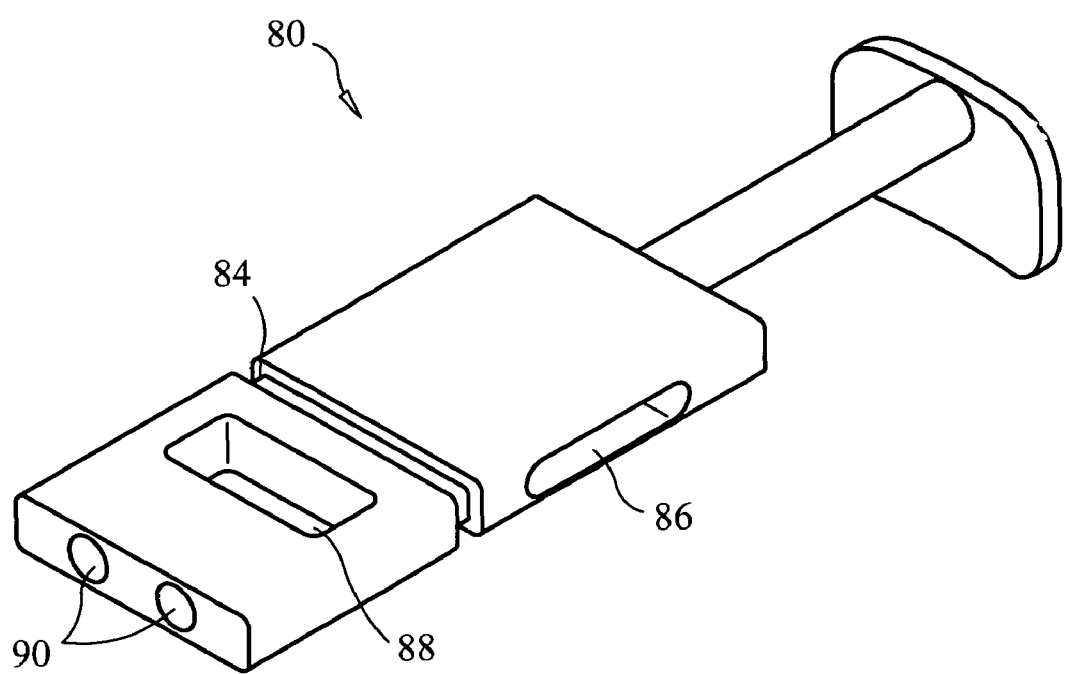
FIG. 20 is a perspective view of the plunger of the embodiment of the invention of FIGS. 18 and 19.

Referring to FIG. 20, a preferred embodiment of slide 80 is presented in detail. Slide 80 is preferably provided with main indent 84, which is sized to accommodate an O-ring (not shown). The O-ring seals slide 80 against the walls of slide cavity 82 and prevents the contents of bottle 12 from leaking out of slide cavity 82. Slide 80 is also preferably provided with side indent 86 into which a pin (not shown) attached to body 14 protrudes, preventing the removal of slide 80 from slide cavity 82. Closure 10 is operative to close the dispensing opening when slide 80 is in the out position (and main hole 88 is not in alignment with inner port 22) and is operative to open the dispensing opening when slide 80 is in the depressed position (and main hole 88 is at least partially in alignment with inner port 22). In a preferred embodiment, slide 80 is also provided with spring cavities 90 in which compression springs (not shown) are mounted. The compression springs urge slide 80 into the out position.

Many variations of the invention will occur to those skilled in the art. Some variations include incorporation and use of a lever-like member instead of a carabiner gate for operation of the piston. Other variations call for incorporation and use of a carabiner-like member or a button-like member. All such variations are intended to be within the scope and spirit of the invention.

Although some embodiments are shown to include certain features, the applicant specifically contemplates that any feature disclosed herein may be used together or in combination with any other feature on any embodiment of the invention. It is also contemplated that any feature may be specifically excluded from any embodiment of the invention.

What is claimed is:

1. A dispensing closure for a bottle, said closure comprising:
   a cap body, said cap body being attachable to the bottle, said cap body comprising an outer surface and an inner surface having a fulcrum, said cap body having a dispensing opening therein, said dispensing opening connecting an inner port to a mouthpiece, and said cap body having a tubular passage therein into which an O-ring having an inner diameter is installed;
   a carabiner spine that is fixed to said cap body, said carabiner spine having a first hook;
   a carabiner gate that is pivotably attached to said cap body at a pivot point, said carabiner gate having a second hook that is connectable to said first hook, said carabiner gate being capable of assuming a connected position, an intermediate position and a full open position;
   a sealing member comprising a stopper end, a lever arm having a lug, and a pivoting end that is pivotably attached to said fulcrum, said sealing member having a closed position in which it is seated against and closes said inner port and an open position in which it is not seated against and does not close said inner port, said sealing member being urged into said closed position by a first spring;
   a piston and a second spring that are movably seated in said tubular passage, the inner diameter of said O-ring accommodating said piston, said piston having two ends, a first end having a slot into which said lug extends, said piston being urged by said second spring in a direction that causes said sealing member to assume said closed position and said hooks to connect, and a second end; and
   a connecting member that movably connects said pivot point to said second end;
   whereby said closure is operative to close said opening when said carabiner gate is in the connected position or in the intermediate position and is operative to open said opening when said carabiner gate is in the full open position.

2. The dispensing closure of claim 1 wherein said inner port comprises a ridge around said dispensing opening and said stopper end comprises an elastomeric pad that is configured to seal against said ridge.

3. The dispensing closure of claim 2 wherein said elastomeric pad is conical in shape and operative to shed water.

4. The dispensing closure of claim 1 wherein said mouthpiece is oval in shape and is sized to allow a user's mouth opening to fit around it, leaving about ten percent of said mouth opening available for air to enter said mouthpiece during a drinking operation.

5. The dispensing closure of claim 1 wherein said cap body, said carabiner spine and said carabiner gate produce a handle defining an aperture and are configured to allow a user to grasp the closure by inserting two or three fingers into the aperture defined by this handle.

6. A container comprising:
   a bottle; and
   a dispensing closure comprising:
      a cap body, said cap body being attachable to the bottle, said cap body comprising an outer surface and an inner surface having a fulcrum, said cap body having a dispensing opening therein, said dispensing opening connecting an inner port to a mouthpiece, and said cap body having a tubular passage therein into which an O-ring having an inner diameter is installed;
      a carabiner spine that is fixed to said cap body, said carabiner spine having a first hook;
      a carabiner gate that is pivotably attached to said cap body at a pivot point, said carabiner gate having a second hook that is connectable to said first hook, said carabiner gate being capable of assuming a connected position, an intermediate position and a full open position;
      a sealing member comprising a stopper end, a lever arm having a lug, and a pivoting end that is pivotably attached to said fulcrum, said sealing member having a closed position in which it is seated against and closes said inner port and an open position in which it is not seated against and does not close said inner port, said sealing member being urged into said closed position by a first spring;
      a piston and a second spring that are movably seated in said tubular passage, the inner diameter of said O-ring accommodating said piston, said piston having two ends, a first end having a slot into which said lug extends, said piston being urged by said second spring in a direction that causes said sealing member to assume said closed position and said hooks to connect, and a second end; and a connecting member that movably connects said pivot point to said second end;

whereby said closure is operative to close said opening when said carabiner gate is in the connected position or in the intermediate position and is operative to open said opening when said carabiner gate is in the full open position.

7. A method of operating a dispensing closure on a container, said dispensing closure comprising a cap body, said cap body being attached to the container, said cap body comprising an outer surface and an inner surface having a fulcrum, said cap body having a dispensing opening therein, said dispensing opening connecting an inner port to a mouthpiece, and said cap body having a tubular passage therein into which an O-ring having an inner diameter is installed; a carabiner spine that is fixed to said cap body, said carabiner spine having a first hook; a carabiner gate that is pivotably attached to said cap body at a pivot point, said carabiner gate having a second hook that is connectable to said first hook, said carabiner gate being capable of assuming a connected position, an intermediate position and a full open position; a sealing member comprising a stopper end, a lever arm having a lug, and a pivoting end that is pivotably attached to said fulcrum, said sealing member having a closed position in which it is seated against and closes said inner port and an open position in which it is not seated against and does not close said inner port, said sealing member being urged into said closed position by a first spring; a piston and a second spring that are movably seated in said tubular passage, the inner diameter of said O-ring accommodating said piston, said piston having two ends, a first end having a slot into which said lug extends, said piston being urged by said second spring in a direction that causes said sealing member to assume said closed position and said hooks to connect, and a second end; and a connecting member that movably connects said pivot point to said second end; said container having water therein, said method comprising:

pressing downward on the carabiner gate placing it in the full open position; and placing the mouthpiece in a user's mouth and tipping the container up, thereby allowing the water to flow into the user's mouth.

8. A dispensing closure for a bottle, said closure comprising:

a cap body comprising an outer surface and an inner surface having a fulcrum, said cap body having a dispensing opening and a piston guide therein;

a piston slidably disposed in said piston guide, said piston having a first end and a second end;

a connecting member that is pivotably connected to said first end;

an operating lever having one end that is pivotably connected to said outer surface and an intermediate portion that is pivotably connected to said connecting member, said operating lever having an up position and a down position;

a sealing member comprising a sealing end, a lever arm and a pivoting end, said lever arm being pivotably connected to said second end and said pivoting end being pivotably connected to said fulcrum; and a first spring that is mounted in said piston guide that urges said piston to a position that causes said sealing end to seal said dispensing opening and said operating lever to assume said up position.

9. The dispensing closure of claim 8 further comprising:
a second spring that is mounted on said fulcrum that urges said sealing end to seal said dispensing opening.

10. The dispensing closure of claim 8 further comprising:
a carabiner spine that is fixed to said outer surface, said carabiner spine having a first hook; and
wherein said operating lever is a carabiner gate having a second hook that engages with said first hook when said carabiner gate is in the up position.

11. The dispensing closure of claim 8 further comprising:
an oval shaped mouthpiece that protrudes from said outer surface; and
wherein said dispensing opening perforates said oval shaped mouthpiece.

12. A dispensing closure for a bottle, said closure comprising:

a cap body, said cap body being attachable to the bottle, said cap body comprising an outer surface and an inner surface, and said cap body having a dispensing opening therein, said dispensing opening connecting an inner port to a mouthpiece, and said cap body having a tubular passage therein;

a loop having a first portion that is fixed to said cap body and a second portion that is capable of pivoting movement around a first pivot point between a connected position and an unconnected position;

a sealing member comprising a stopper end, a lever arm that is pivotably attached to said inner surface, and a pivoting end, said sealing member having a closed position in which it is seated against and closes said inner port and an open position in which it is not seated against and does not close said inner port; and a connecting mechanism comprising a connecting member and a piston that links said second portion to said lever arm, said connecting mechanism being capable of causing movement of said second portion to said unconnected position and of moving said sealing member to said open position.

13. A closure for a container, said closure comprising:

a cap body comprising an outer surface and an inner surface, said cap body having a dispensing opening and a piston guide therein;

a piston slidably disposed in said piston guide, said piston having a first end and a second end;

a connecting member that is pivotably connected to said first end;

an operating lever having one end that is pivotably connected to said outer surface and an intermediate portion that is pivotably connected to said connecting member, said operating lever having an up position and a down position;

a sealing member comprising a sealing end, a lever arm and a pivoting end, said lever arm being connected to said second end and said pivoting end being pivotably connected to said inner surface; and a spring that is mounted in said piston guide that urges said piston to a position that causes said sealing end to seal said dispensing opening and said operating lever to assume said up position.

14. A closure for a container, said closure comprising:

a cap body, said cap body being attachable to the bottle, said cap body comprising an outer surface and an inner surface, and said cap body having a dispensing opening therein, said dispensing opening connecting an inner port to a mouthpiece;

a carabiner loop having a first portion that is fixed to said cap body and a second portion that is capable of pivoting movement around a first pivot point from a connected position through an intermediate position to a full open position;

a sealing member comprising a stopper, a lever arm and a pivoting end that is pivotably attached to said inner surface, said sealing member having a closed position in which said stopper is seated against and closes said inner port when said carabiner loop is in the connected position and an open position in which said stopper is not seated against and does not close said inner port; and a connecting mechanism comprising a connecting member that is pivotably attached to a piston that links said second portion to said lever arm, said connecting mechanism being operative to cause movement of said second portion to said full open position and to move said sealing member to said open position.

* * * * *